United States Patent [19]

Kullmann

[11] 4,289,986

[45] Sep. 15, 1981

[54] COOLANT CONNECTING HEAD FOR AN ELECTRIC MACHINE WITH A SUPERCONDUCTING ROTOR WINDING

[75] Inventor: Dieter Kullmann, Langenzenn, Fed. Rep. of Germany

[73] Assignee: Siemens Aktiengesellschaft, Berlin & Munich, Fed. Rep. of Germany

[21] Appl. No.: 105,219

[22] Filed: Dec. 19, 1979

[30] Foreign Application Priority Data

Dec. 27, 1978 [DE] Fed. Rep. of Germany ....... 2856128

[51] Int. Cl.$^3$ ............................................. H02K 9/00
[52] U.S. Cl. ........................................ 310/61; 62/55; 62/505; 277/15; 285/47; 285/DIG. 5
[58] Field of Search ..................... 62/55, 505; 310/54, 310/61; 277/15; 285/47, DIG. 5

[56] References Cited

U.S. PATENT DOCUMENTS

| | | | |
|---|---|---|---|
| 3,207,533 | 9/1965 | Van Gundy et al. | 285/47 |
| 3,845,639 | 11/1974 | Smith, Jr. | 62/505 |
| 4,047,742 | 9/1977 | Haferkamp et al. | 285/47 |
| 4,207,745 | 7/1980 | Pouillange | 62/55 |

*Primary Examiner*—Ronald C. Capossela
*Attorney, Agent, or Firm*—Kenyon & Kenyon

[57] ABSTRACT

A coolant connecting head for an electric machine which contains a rotor with a superconducting winding, the head including a device for feeding a coolant from a non-rotating coolant line part into a rotating coolant line part, with at least one sealing device for sealing a space formed between these line parts with a pre-determined pressure dependent leakage rate in which, for sealing off the interspace, a further sealing device with an adjustable seal gap formed between the sealing surfaces thereof is provided so that, during the cooling down phase of the winding, the coolant leakage rate can be kept low with this further sealing device.

9 Claims, 1 Drawing Figure

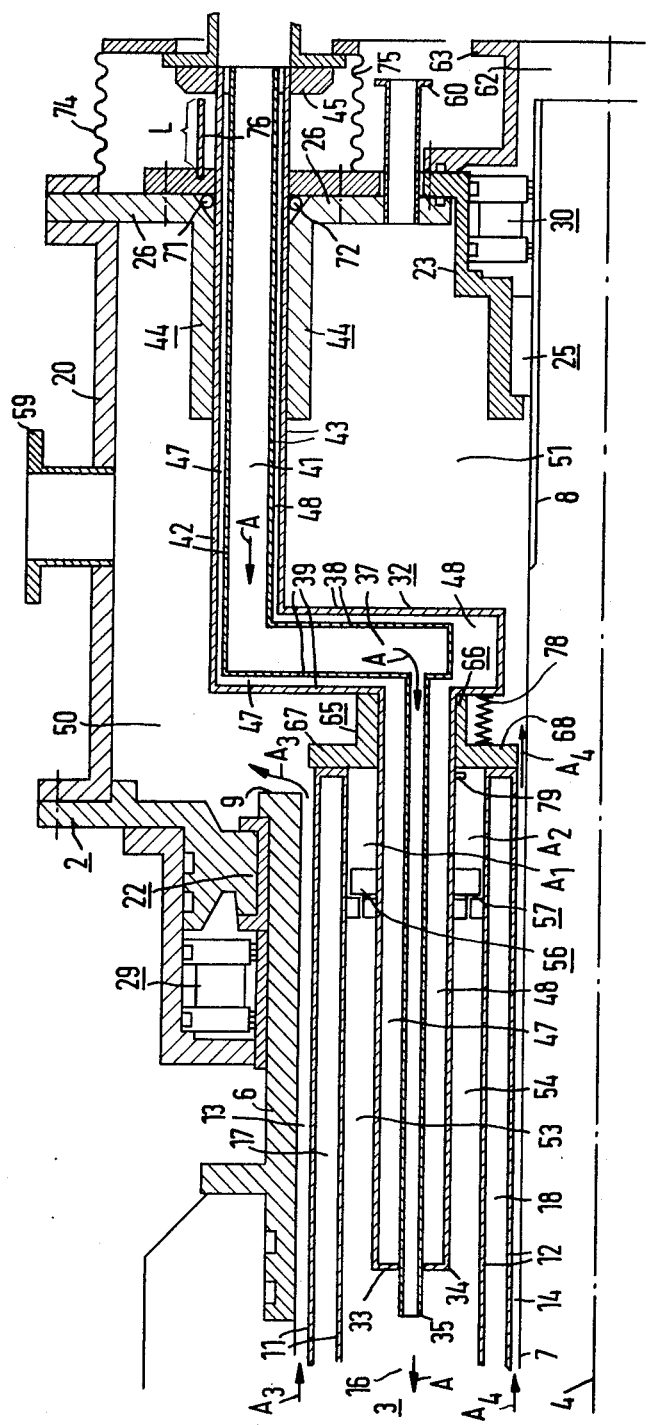

COOLANT CONNECTING HEAD FOR AN ELECTRIC MACHINE WITH A SUPERCONDUCTING ROTOR WINDING

BACKGROUND OF THE INVENTION

This invention relates to electric machines with superconducting rotor windings in general and more particularly to a coolant conducting head for such a machine.

A coolant connecting head for an electric machine which comprises a rotor supported rotatably about an axis with a superconducting winding which can be deep cooled by a coolant, with a device for feeding the coolant from a non-rotating coolant line part into a rotating coolant line part connected to the rotor, which contains at least one sealing device which serves for sealing off a space formed between said line parts and which allows, in the operating condition of the machine, a predetermined leakage rate which depends on the pressure difference prevailing therein is described in the literature reference "Advances in Cryogenic Engineering," vol. 23, New York, 1978, pages 125 to 131.

For cooling a superconducting winding in the rotor of an electric machine, especially of a turbo-generator, devices must be provided for conducting a coolant between the rotor and stationary connecting lines. The coolant, for instance, liquid or gaseous helium, is fed to the winding in the rotor or is discharged again therefrom through such a device. The machine is therefore provided with a connecting head which contains a suitable transfer device. The design of this device, also called a coupler, is difficult, especially with respect to low thermal losses of the coolant loop for the superconducting winding and with respect to low leakage rates. For, the coupler must have rotary seals with relatively little friction, which seal the coolant, particularly the liquid helium, on the one hand, from the outside and which, on the other hand, separate the inlet side from the outlet side within the rotating system. The sealing devices required therefor must, in addition, permit radial and axial shaft clearance and operate without trouble for extended periods of time, e.g., several years.

The known coolant connecting head contains a suitable helium coupler. It is provided with a hollow cylindrical stationary housing, into the interior of which a tubular feed line extends. The open end of this feed line is concentrically surrounded by the end section of a conduit firmly connected to the rotating parts of the machine, so that an annular space is formed between these two tubes. The concentric position of the two tube sections is ensured via bearings provided for this purpose. To prevent the helium which is fed in from escaping through the space to the outside, a seal with a predetermined gap is provided, for instance (see FIG. 3). The dimensions of the gap are made so that contact between rotating and stationary parts of the transfer device is prevented in the event of radial and axial vibrations of the rotor shaft so as to preclude friction heat and wear of parts of the seal. In general, the seal gap cannot be made arbitrarily small and a certain leakage rate must be tolerated.

The leakage rates in sealing devices with gaps between rotating and non-rotating, largely contactless sealing parts can be kept relatively small if a so-called self-pumping effect in thermal-syphon loops is utilized for the cooling system of the winding of a rotor (cf., the journal "Cryogenics," July, 1977, pages 429 to 433, and DE-OS No. 25 30 100). For then, the coolant only needs to be fed into the rotor at the transfer device with a relatively small overpressure, so that a correspondingly small pressure difference prevails at the sealing devices. This is true, however, only for the cooling system in the cooled down condition. For, during the cooling down phase of the winding and especially during the starting phase, the flow resistance of the cooling system is still very high. Since, to achieve acceptable cooling down times, considerably higher coolant throughputs are required than in the cooled down state, i.e., the coolant must be fed into the cooling system with correspondingly higher pressure during these times, correspondingly larger leakage losses result in these sealing devices during this cooling down phase.

SUMMARY OF THE INVENTION

It is therefore an object of the present invention to describe a coolant connecting head with such a device for conducting a coolant from non-rotating to rotating coolant line parts, the coolant losses of which are relatively small at the sealing devices of this transfer device during the cooling down phase of the machine.

According to the present invention, this problem is solved for a coolant connecting head of the type mentioned at the outset by providing at least one further sealing device for sealing off the interspace with an adjustable sealing gap formed between the sealing surfaces thereof.

The advantages of this design of the coolant connecting head are in particular that during the cooling down phase of the winding the sealing gap of the further sealing device can be kept so small that an appropriately good seal of the coolant is realized there. During this cooling down phase, the rotor of the machine is generally kept at a relatively low speed, so that only correspondingly small friction losses and wear phenomena at the sealing surfaces of the further sealing device can occur. If the winding is then cooled down to the operating temperature and the coolant throughout reduced to a low final value, the sealing gap of the further sealing device can be enlarged again to predetermined dimension. The sealing at the transfer device then takes place essentially only at the first sealing device, and the rotor of the machine can be brought to the nominal speed of the operating condition without difficulty.

According to a further advantageous embodiment of the coolant connecting head according to the present invention, the coolant line parts contain concentrically arranged tube end sections which in part surround each other, and the further sealing device is provided at the end face of one of the tube end sections. For, at this point, the further sealing device with its adjustable sealing gap can be arranged in a particularly simple manner.

The further sealing device can further advantageously contain a non-rotating seal part which is mechanically connected to the non-rotating tube section, and this tube end section may be movable in the axial direction. The sealing gap formed between the non-rotating seal part and a rotating seal part can therefore be adjusted in a simple manner by means of a corresponding shift of the non-rotating tube end section.

The further sealing device can furthermore advantageously be a sliding ring equal. Such seals are of simple design and their sealing gap can easily be adjusted through the choice of a corresponding distance between its seal parts.

BRIEF DESCRIPTION OF THE DRAWING

The single FIGURE is a schematic longitudinal cross section of an embodiment of a coolant connecting head according to the present invention.

DETAILED DESCRIPTION OF THE INVENTION

In the FIGURE, only the upper half of a coolant connecting head for a machine is illustrated as a longitudinal section. This machine, not further detailed in the FIGURE, may in particular be a turbo-generator which contains a rotor with a superconducting field winding that can be cooled to a low temperature and is surrounded by at least one co-rotating damper shield which generally can also be cooled, to reduce heat inflow into the deep-cooled winding, the latter is furthermore surrounded by vacuum spaces. To this end, the entire rotor can be enclosed by a co-rotating vacuum housing (see U.S. Pat. No. 3,942,053 and "Siemens Forschungs- und Entwicklungsberichte," vol. 5, 1976, No. 1, pages 10 to 16). However, the rotor can also rotate in a vacuum space.

The coolant connecting head, detailed only in part in the FIGURE, of the machine contains a stationary head part 2, into which the lateral end section 3 of a shaft supported rotatably about an axis of rotation 4 is inserted. This shaft end section is connected to the rotor, not shown in the FIGURE, and is usually located on that side of the machine which is opposite the drive side. The shaft end section 3 contains a hollow outer cylinder 6 at room temperature which is arranged concentrically about an inner hollow cylinder 7, the end section 8 of which protrudes a predetermined length from the open end face 9 of the outer hollow cylinder 6. Between the outer hollow cylinder 6 and the inner hollow cylinder 7, two double tubes 11 and 12 are arranged concentrically in such a manner that an outer annular canal 13 is formed between the outer double tube 11 and the outer hollow cylinder 6, and an inner annular canal 14 between the inner double tube 12 and the inner hollow cylinder 7. The double tubes 11 and 12 define radially outward an annular space 16. Each tube consists of two concentrically arranged hollow cylinders which are closed off in a vacuum tight manner from each other at their end face. The interiors 17 and 18 thus formed between the two hollow cylinders of each double tube are evacuated for reasons of thermal insulation.

The connecting head part 2 also contains a substantially hollow cylindrical non-rotating outer housing 20 which encloses the end of the rotating outer hollow cylinder 6 of the shaft end section 3 for a distance in the axial direction and is supported at this hollow cylinder 6 via a main bearing 22. In addition, the connecting head part 2 contains an inner, substantially hollow cylindrical housing part 23 which concentrically encloses the end section 8 of the inner rotating hollow cylinder 7 of the shaft end section 3 and which is supported at the end section 8 via a secondary bearing 25. This housing part 23 is rigidly connected via an end part 26, of essentially annular disc shape, to the outer housing 20. The parts 20, 23 and 26 define essentially an inner space located ahead of the end face 9 of the outer hollow cylinder 6 of the shaft end section 3 inside the connecting head part 2. For sealing this inner space, a sealing system 29 is provided parallel to the bearing 22 between the non-rotating outer housing 20 and the rotating hollow cylinder 6. Similarly, the inner housing part 23 is also sealed from the end section 8 of the inner hollow cylinder 7 by means of a sealing system 30. These sealing systems may be, for instance, ferro-fluidic seals, such as are known from British Pat. No. 1,312,698.

At the connecting head part 2, the inlet and outlet of the coolant required for cooling the superconducting field winding, generally helium, are provided. To this end, liquid helium A is fed into the annular space 16 between the double tubes 11 and 12 via a feed device 32. This device contains two double tube sections 33 and 34 which are arranged concentrically to the axis of rotation 4 and extend into the annular space 16, and between which an annular feed canal 35 is formed. This feed canal, extending parallel to the axis, is connected at its end extending into the interior of the connecting head part 2 to a radially extending feed canal 37, which is formed between two annular line parts 38 and 39 which are designed as double walls. This radial feed canal 37 is connected to a further feed canal 41 which extends parallel to the axis and whose distance from the axis of rotation 4 is larger in comparison with the corresponding distance of the feed canal 35. This feed cnal 41 with an annular cross section is formed between two double tube sections 42 and 43, which protrude from the face part 26, provided with a corresponding, sealed feedthrough 44, of the connecting head part 2 and which are provided with a connecting flange 45, to which a refrigeration device supplying the liquid helium A can be connected by a connecting line, not shown in the FIGURE. Since all helium carrying parts of the feed device 32 are constructed with double walls, the spaces 47 and 48 provided between respective adjacent walls can be evacuated for reducing the heat inflow to the liquid helium A.

According to the illustrated embodiment, the feed device 32 subdivides the interior which is formed in the connecting head part 2 and is confined by the parts 20, 23 and 26, into two separate subspaces 50 and 51. Optionally, however, these two subspaces can also be connected to each other by providing, for instance, several radial double-tube sections spaced from each other instead of the two double-wall line sections 38 and 39.

To prevent the liquid helium A fed into the annular space 16 from directly flowing back into the subspaces 50 and 51 of the interior of the connecting head part 2, at least one ring shaped sealing device 56 and 57, respectively, is provided in the annular space 53 formed between the tubes 11 and 33 as well as in the corresponding annular space 54 between the tubes 12 and 34. These sealing devices, only indicated in the FIGURE, may, for instance, be labyrinth seals or lip seals. Only a relatively small percentage, designated as $A_1$ and $A_2$, respectively, of the helium A gets into the interior 50 and 51, respectively, of the connecting head part 2 via their seal gaps if the pressure differences between both sides of each sealing device are relatively small.

In addition, the helium which is warmed up in the rotor of the machine and is designated as $A_3$ and $A_4$, is fed into these interior spaces 50 and 51 via the annular canals 13 and 14 and is mixed there with the helium $A_1$ and $A_2$. A flange 59 is provided at the outer housing 20 of the connecting head part 2 for removing the helium mixture $A_1$, $A_3$ from the interior 50. Similarly, the helium mixture $A_2$, $A_4$, is conducted from the interior space 51 via a flange 60 in the end part 26 of the connecting head part 2. To these flanges, return lines for the coolant are connected which are in turn connected to the refrigeration unit but are not shown in the FIGURE.

In the machine according to the illustrated embodiment it is assumed that the vacua for the thermal insulation of the cold parts of the rotor, especially the superconducting field winding, are maintained by continuous evacuation of the appropriate vacuum spaces. This purpose is served by using the inner hollow cylinder 7 of the shaft end section 3 as a co-rotating evacuation tube. The end section 8 of this hollow cylinder opens, for this purpose, into a subspace 62 of the connecting head part 2 near the axis, which is confined by the inner housing part 23, the end part 26 and the secondary bearing 25 and the sealing system 30, respectively. For evacuating this subspace 62, the end part 26 is provided with a corresponding connecting flange 63, to which an external evacuating device can be connected. The sealing system 30 disposed between the hollow cylindrical housing part 23 and the end section 8 of the evacuating tube 7 seals the subspace 62 in a vacuum tight manner from the interior space 51 of the connecting head part 2.

For cooling the field winding of the rotor of the machine, the so-called self-pumping effect in thermal-syphon loops is to be utilized advantageously in the operating condition, i.e., at a predetermined speed of the cooled down rotor of, for instance, 50 sec$^{-1}$. For this purpose, a cooling system with heat exchangers laid out accordingly must be provided, which are located on a large radius. The coolant leaving the field winding enters these heat exchangers still cold and is warmed up there to temperatures which are, for instance, between 100 and 300 K., before it is returned to a smaller radius again and is discharged to the outside via the coolant transfer device of the connecting head. For example, in the operating condition of a 2000-MWA generator with a helium throughput of about 5 to 10 g/sec, the pressure drop in these heat exchangers must remain at values below about 40 mbar, so that the self-pumping effect leads to a desired temperature lowering of the field winding.

During the cooling down phase of the machine, however, especially the flow resistances of these heat exchangers must be overcome. Thus, pressure differences, for instance, of the order of 1 to 2 bar are necessary to pump the amounts of cooling of, for instance, about 100 g/sec, as required in the starting phase, through the cooling system of the machine. Such pressure differences, however, initially lead to a leakage rate 10 to 20 times higher in the sealing devices 56 and 57 than in the operating state where only a pressure difference of, for instance, about 0.1 bar prevails across the sealing devices. Through the cooling down of the gaps of the sealing devices which occurs, their flow resistances can be reduced even further and the leakage losses increase further.

According to the present invention, the coolant connecting head is therefore provided with further sealing devices which are to become effective during the cooling down phase of the rotor. To this end, the annular space 53 containing the sealing device 56 as well as the annular space 54 containing the sealing device 57 is sealed from the interior spaces 50 and 51 additionally by a sliding ring seal made up of elements 65 and 66, respectively. These sliding ring seals are advantageously designed so that they have sealing surfaces or seal gaps which lie in planes which are radial with respect to the axis of rotation. They therefore contain parts 67 and 68, respectively, in the shape of annular discs which extend in the radial direction and rest against the ring like end face of the double tube 11 or the double tube 12, respectively with a slid-respectively with a sliding fit. The sliding ring seals 65 and 66 are advantageously fastened to the helium feeding device 32. This feed is designed so that it can be moved in the direction parallel to the axis, so that with its aid, the seal gaps formed between the sliding ring seals and the corresponding double tubes are adjustable. The double-tube sections 42 and 43 of the feeding device 32 are therefore brought through the sealed feedthrough 44 of the end part 26. For sealing these, for instance, O-rings 71 and 72 between the double tube sections and the end part are used.

During the cooling down phase of the field winding, when the rotor of the machine rotates at most at low speeds of, say, 2 sec$^{-1}$, the helium feeding device 32 is then pushed axially toward the rotor into the connecting head part 2 until the annular parts 67 and 68 of the sliding ring seals 65 and 66 rest against the end faces of the double tubes 11 and 12, forming a tight seal. This purpose can be served for instance, by suitably pre-tensioned spring bellows 74 and 75 arranged concentrically to each other between the end part 26 and the connecting flange 45. The spring travel of the bellows can be limited to a pre-determined minimum length L via a stop 76. Since the cooling down process takes place when the speed of the rotor is low, the sliding ring seals are not subject to any particular wear. Their sealing ability is also maintained by means of the spring bellows 74 and 75 during the cooling down phase, shrinkage effects due to the cooling down being compensated.

In the final phase of the cooling down process, i.e., immediately before the speed of the rotor is increased to the nominal speed of, for instance, 50 sec$^{-1}$, the feeding device 32 with its sliding ring seals 65 and 66 is retracted in the axial direction, for instance, by a suitable readjustment of the stop 76, until a predetermined minimum distance of the sealing surfaces at the sliding ring seals 65 and 66 is maintained. The throughput of coolant is then already reduced to a lower, steady-state end value, and the leakage losses at the sealing devices 56 and 57 remain tolerable. When the machine rotates at the nominal speed, friction heat at the sealing surfaces of the sliding ring seals 65 and 66 and therewith, corresponding wear of these seals is avoided.

To ensure uniform contact of the annular parts 67 and 68 of the sliding ring seals 65 and 66 at the end faces of the double tube 11 and the double tube 12, respectively, and thereby, at least approximately the same sealing properties of these seals, the sliding ring seal 65 is fastened rigidly on the double tube 33, while the sliding ring seal 66 can be moved on the double tube 34 to a predetermined extend. To provide for such movement, and axially extending pre-tensioned spring bellows 78 between the annular line part 39 of the feeding device 32 and the annular part 68 of the seal 66 is used. These bellows are also used for sealing the sliding ring seal 66 from the double tube 34. To limit the maximum expansion of the spring bellows and the advance of the seal 66 toward the double tube 12, a stop element 79 is fastened on the doble tube 12.

In the illustrated embodiment shown in the FIGURE, it was assumed that the coolant A is fed from a stationary into a rotating line part at a predetermined distance from the axis of rotation in a direction parallel to the axis. According to the present invention, additional adjustable sealing devices can also be provided equally well for a coolant connecting head with a central coolant feed, however.

In addition, the readjustable sealing devices of the coolant connecting head according to the present invention can also be designed as an overpressure valve in view of a possible disturbance in the machine, in which the superconducting field winding goes into the normally conducting state and the helium exhaust gas quantities $A_3$, $A_4$ increase suddenly.

In the embodiment of the FIGURE, it was further assumed that the annular spaces 53 and 54 can be sealed with a single sealing device 65 and 66 during the cooling down phase. Optionally however, also several such sealing devices can be provided for sealing each ring space.

The coolant connecting head according to the present invention is suitable especially for rotors with superconducting field windings, for the cooling of which the self-pumping effect is to be utilized and the additional sealing devices of which have largely contactless gaps between the rotating and non-rotating parts. However, coolant connecting heads with additional seals are also suitable for any other cooling systems, in which, during the cooling down phase, leakage rates substantially higher than in the operating condition are to be avoided at the sealing devices.

What is claimed is:

1. In a coolant connecting head for an electric machine, which machine contains a rotor supported rotatably about an axis a superconducting winding which can be deep cooled by a coolant, and a device for feeding the coolant from a nonrotating coolant line part into a rotating coolant line part connected to the rotor, and containing at least one sealing device which seals off an interspace formed between these line parts and which, in the operating state of the machine, allows a predetermined leakage rate which depends on the pressure difference prevailing there, the improvement comprising at least one further sealing device with an adjustable seal gap formed between the sealing surfaces thereof for sealing the interspace, whereby said seal gap may be adjusted according to the operating condition of the electric machine so as to be fully effective during the cooling down phase and adjusted to be no longer fully effective after the machine has reached its nominal speed.

2. The improvement according to claim 1, wherein the coolant line parts contain tube end sections which are arranged concentrically to each other and in part enclose each other, and wherein said further sealing device is disposed at the end face of one of the tube end sections.

3. The improvement according to claim 2 wherein said further sealing device comprises a sliding seal.

4. The improvement according to claim 1, wherein said seal gap extends in a plane radial with respect to the axis of rotation of said further sealing device.

5. The improvement according to claim 2, wherein said further sealing device contains a non-rotating seal part which is mechanically connected to the non-rotating tube end section and wherein said tube end section can be moved in the axial direction.

6. The improvement according to claim 2, wherein the rotating sealing surface of said further sealing device is located at the end face of the rotating tube end section.

7. The improvement according to claim 5 or 6, and further including a pre-tensioned spring system acting on the non-rotating tube end section adapted to generate a predetermined axial pressure of the seal parts of said further sealing device at low speed of the machine onto their common sealing surface.

8. The improvement according to claim 7, and further including an adjustable stop for limiting the maximum spring travel of the spring system to a predetermined length.

9. The improvement according to claim 1 and further including a stop for adjusting the seal gap of the further sealing device to a defined minimum distance of the seal surfaces at the nominal speed of the machine.

* * * * *